United States Patent [19]

Immler et al.

[11] Patent Number: 5,323,061
[45] Date of Patent: Jun. 21, 1994

[54] POWER GENERATOR UNIT IN COMBINED HEAT AND POWER GENERATION TECHNIQUE

[75] Inventors: Volker Immler; Alfons D. Repnik, both of Weiler, Fed. Rep. of Germany

[73] Assignee: EnerGenius GmbH, Fed. Rep. of Germany

[21] Appl. No.: 924,068

[22] PCT Filed: Jan. 13, 1992

[86] PCT No.: PCT/EP92/00051

§ 371 Date: Nov. 9, 1992

§ 102(e) Date: Nov. 9, 1992

[87] PCT Pub. No.: WO92/12387

PCT Pub. Date: Jul. 23, 1992

[30] Foreign Application Priority Data

Jan. 12, 1991 [DE] Fed. Rep. of Germany ....... 9100340

[51] Int. Cl.$^5$ .................................................. F02G 5/02
[52] U.S. Cl. ........................................ 290/2; 290/1 R
[58] Field of Search ...................................... 290/1 R, 2

[56] References Cited

U.S. PATENT DOCUMENTS

| 3,805,082 | 4/1974 | Murray | 290/1 R |
| 4,657,290 | 4/1987 | Linden | 290/2 |
| 4,736,111 | 4/1988 | Linden | 290/2 |

FOREIGN PATENT DOCUMENTS

| 2500641 | 7/1976 | Fed. Rep. of Germany . |
| 2830922 | 1/1980 | Fed. Rep. of Germany . |
| 3010689 | 9/1981 | Fed. Rep. of Germany . |
| 3014357 | 10/1981 | Fed. Rep. of Germany . |
| 2934647 | 12/1981 | Fed. Rep. of Germany . |
| 3229646 | 9/1984 | Fed. Rep. of Germany . |
| 3408750 | 9/1984 | Fed. Rep. of Germany . |
| 3315462 | 10/1984 | Fed. Rep. of Germany . |
| 3811510 | 10/1989 | Fed. Rep. of Germany . |
| 3816483 | 11/1989 | Fed. Rep. of Germany . |

Primary Examiner—A. D. Pellinen
Assistant Examiner—Robert L. Hoover
Attorney, Agent, or Firm—Claude A. S. Hamrick

[57] ABSTRACT

An electric power generating plant with an electric motor (11) driven by an internal combustion engine (4) is arranged in a chamber enclosed in a housing (1) surrounded by an insulating material (13) via a water jacket. A heat exchanger through which the exhaust gases (18) of the internal combustion engine flow is arranged inside this water jacket.

27 Claims, 3 Drawing Sheets

POWER GENERATOR UNIT IN COMBINED HEAT AND POWER GENERATION TECHNIQUE

BACKGROUND OF THE INVENTION

1. Field of the Invention

This invention deals with a combined heat and power generator unit which includes an internal combustion engine which powers an electric generator. The waste heat of the internal combustion engine is utilized via one or several cooling water circulation systems (motor waste heat, exhaust heat, generator waste heat). These circulation systems are used to heat water. The simultaneously generated electricity is either used by the operating authority—wholly or partially—or is sold to the power company.

2. Brief Description of the Prior Art

Presently known combined heat and power generators have been used mainly for community or commercial purposes, due to the motor size used.

For these applications, individual machine rooms have usually been built; therefore, there were no stringent requirements for soundproofing of the units. The units were mostly "open" (accessible) machines with only the exhaust sounds of the internal combustion unit being dampened using a muffler.

Smaller units, which are on the market in small numbers, have been encapsulated and soundproofed using commercially available soundproofing materials. Therefore sound insulating elements of different designs have been implemented to reduce the noise level.

In all cases one of the two main purposes of the combined heat and power generation units is the generation of heat. This heat is stored "somehow" in all cases because the generation and the usage (of the heat) occurs in many cases, at different times and does not match the demand.

The dampening of soundwaves is a linear function of the weight of the walls being hit by the sound waves. The higher the weight of these walls, the better the sound attenuation.

On all combined heat and power generation units one disadvantage is that one can generate heat and electricity, however the cost for soundproofing alone is relatively high.

Another disadvantage of the known combined heat and power generation units is that the generation of warm water for producing potable water and for heating water is rather costly because the equipment required is located externally from the heat and power generation unit—and they therefore need lots of room and big buildings.

SUMMARY OF THE INVENTION

Object of the Invention

The following invention therefore has the object to expand the combined heat and power generation with heating and potable water as explained here initially, such that the units can be manufactured at less cost and use less room.

Summary

The solution of this task is done by the characteristic features of claim 1. According to this it is significant that the units of the combined heat and power generator are installed into one housing, which in itself is integrated into a hot-water tank.

A characteristic feature of the present invention therefore is that the units for the combined heat and power generation now are no longer separate from the heating water and/or potable water, rather these units are in one housing, which is itself integrated into a hot-water tank. This achieves the advantage that the heat generated by the units of the combined heat and power generation is injected by simple means into the surrounding hot-water tank, where different heat exchanging mechanisms exist, which complement and assist one another.

On the one hand the radiation heat generated from the combined heat and power generation units is introduced into the surrounding hot-water tank. Similarly, the exhaust heat could also be introduced into the hot-water tank.

This results in an optimum heat exchange from the combined heat and power generator's produced waste heat into the hot-water tank.

Another significant advantage of the present invention is that by the integration of the frame, which houses the combined heat and power generators, an optimal sound insulation is ensured. In this invention it is required—as with present state of the art—to insulate a hot-water tank for heating water from a hot-water tank for potable water and to arrange these on separate places, because the warm potable water and the heating water are prepared in the hot-water tank itself.

Only one single insulating cover—surrounding all units—is therefore needed, which significantly saves space and also reduces the manufacturing costs significantly.

By this invention the chamber for accepting the units of the combined heat and power generation has at least three sides, preferably four or more sides surrounded by the hot-water tank.

This results in the following advantages 1) optimal sound proofing, 2) small space requirement, and 3) modular building blocks. With the modular building method it is significant that the units described later can be laid out in several arrangements adjacent to one another.

A feature of the present invention is that the units for the combined heat and power generation consist mainly of a internal combustion motor, which is preferably an Otto engine (gasoline) or a diesel motor. Preferred are piston engines, however one can also use a rotary engine. As a preferred fuel one uses gasoline or heating oil (diesel). The mentioned combustion engines drive an electric motor via a mechanical clutch, which preferably is a three-phase motor.

The power is passed via a coupling of preferably mechanical structure, e.g. via a V-belt which couples the electrical generator via a clutch, which is preferably an electro-magnetic clutch.

By implementing a mechanical coupling (V-belt) between the motor and the electrical generator one obtains the advantage that dependent on the requirements given at the location of use one can place motors of different power ratings without any problem for exchange.

The use of a V-belt in conjunction with a clutch has the additional advantage that, for starting, the generator is initially run as a motor and run to its nominal RPM, after which the clutch is activated to start the internal combustion engine. The combustion engine is then ramped up by the generator working as a motor to its nominal RPM and as soon as the nominal RPM is reached, the combustion motor is supplied with fuel, whereby the combustion motor's nominal RPM is above the RPM of the electric motor. Once the combustion motor has reached its nominal RPM, the electric motor is switched to being a generator.

Another significant feature of the present invention is that the exhaust heat of the combustion engine is used for heating of the hot-water tank. For this provisions have been made to have at least one heat exchanger in the hot-water tank through which the exhaust gases flow, where at the same time a muffler is attached at which end the exhaust is mounted, which exhausts into the atmosphere. The exhaust gases can be used—heat extracted or in their original state—to drive an absorption cooling unit.

Furthermore, it is envisaged that the hot-water tank can be heated by the cooling water circulation of the internal combustion engine. To do this there are several possibilities. In a first method an open cooling water circulation is preferred, i.e. the cooling water is extracted from the bottom of the hot-water tank, is fed via a cooling pump to the internal combustion engine and the heated-up cooling water leaving the motor is injected at the top of the hot-water tank.

The feeding of the water is done in a way that the cooling water in the hot-water tank can not short-circuit itself.

In a second implementation it is intended that the cooling water circulation is separate from the warm water contents of the hot-water tank. Here a separate heat exchanger is needed, through which the cooling water flows. This heat exchanger is built into the hot-water tank.

The generation of the heating water is accomplished by another heat exchanger in the hot-water tank, where the heating water flows through.

The generation of the potable water is accomplished by another heat exchanger in the hot-water tank, where the potable water flows through.

Due to space constraints provisions could be made to arrange the heat exchangers separately in the hot-water tank; however, the heat exchangers could also be interlocked.

Incidentally, for repair- and maintenance purposes it is essential to mount the units for the combined heat and power generation (essentially the internal combustion engine and the included electric motor/generator) onto a common slide, such that after opening of an access door the slide can be pulled out and the units become easily accessible for maintenance.

The subject of the present invention consists not only of the subject of the individual claims, but also from the combination of the individual claims among each other. All details and characteristics shown in the documents—including the abstract—especially the layouts shown in the drawings, are being claimed as essential to the invention, as much as they are individually or in a combination new to the state of the art.

In the following, the innovation is explained further based on drawings showing several possible implementations. From the drawings and their descriptions following, further significant features and advantages of the invention will become apparent.

IN THE DRAWING

DETAILED DESCRIPTION OF THE PREFERRED EMBODIMENTS

Figure 1:
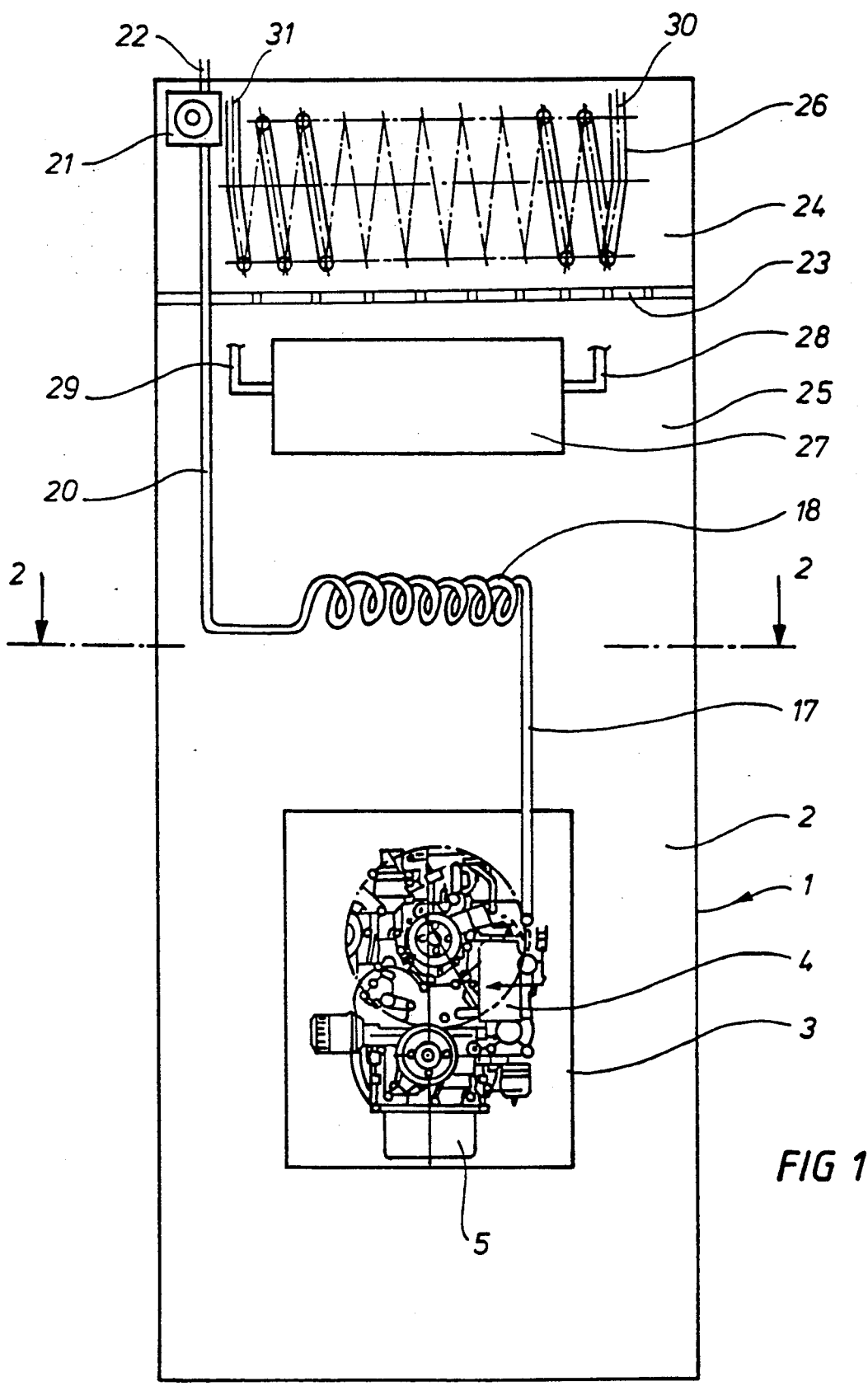
FIG. 1 is a schematic elevation of a first embodiment of the invention.
Figure 2:
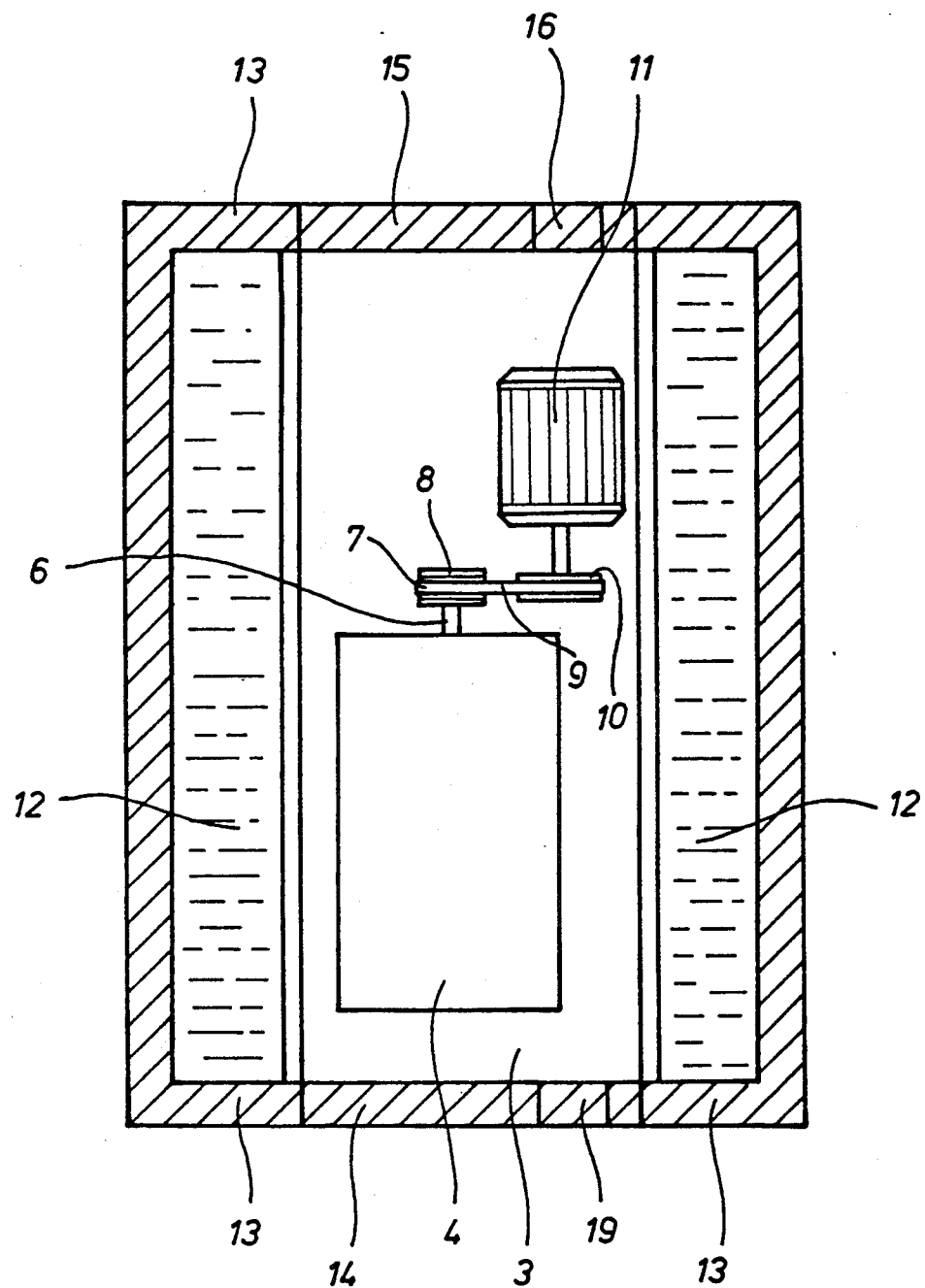
FIG. 2 is a cross section along the line 2—2 in FIG. 1.

According to FIGS. 1 and 2, the hot-water tank consists in essence of a housing 1, preferably made from steel sheet metal which is surrounded by an endless insulating casing 13. The insulation casing 13 is made in known fashion e.g. from insulating material which is surrounded by either a plastic or a sheet metal casing.

It is important that the housing 1 can be made from relatively cheap sheet metal, which can be processed using simple bending methods and that the housing 1 in the front view (FIG. 1) and in the top view (FIG. 2) is shaped essentially rectangularly. The manufacturing cost of such a housing is therefore low. It is self-evident, however, that the housing 1 could also be made round or be shaped otherwise.

According to the present general description it is also intended that the housing 1 is made as a heat accumulator and there it is intended that the housing 1 is completely filled with a liquid 2. The liquid 2 could be either water or a water-coolant mixture or the like.

The Figures also illustrate an enclosure 3 farming a chamber integrated into the heat accumulator, in which the units of the combined heat and power generator are located These units are essentially the internal combustion engine 4 which is coupled via a later to be described mechanical clutch with the electric motor 11, which is also usable in a generator mode.

The internal combustion engine 4 shows a driving shaft 6 which is solidly connected with a V-pulley 7, onto which a clutch 8 is attached. The V-belt 9 runs on the clutch 8 and drives the electric motor via the pulley 10.

In known fashion the internal combustion engine 4 is either a Diesel or an Otto engine and has a lower oil pan 5 and in general almost all known parts of an internal combustion engine. All units 4, 11 are mounted movably by means of a slide 46 onto a base 45 fixed to the housing, such that the slide 46 can be s pulled out a in direction perpendicular to the plane of the paper of FIG. 3 and thereby allowing an easy maintenance access. Thus, an oil change can be simply done on the oil pan 5.

As shown in FIG. 2, the water 12 within the heat accumulator is partitioned off by enclosure 3 so that a chamber is defined within the body of the heat accumulator in which the insulating casing 13 forms a front door 15 and a back door 14. By opening either one of the doors 14, 15 the units in the chamber 3 are easily accessible.

In one of the doors 15 an air intake muffler 16 is installed for the sound proofed inlet of the combustion and cooling air, while in the adjacent door 14 an exhaust air muffler 19 is located.

The cooling of the internal combustion engine is done via water cooling, preferably implemented as an open cooling circuit. Thus, the hot cooling water is routed, via a pipe 37, in the direction of the arrow 38, through the water reservoir of the heat accumulator, where the pipe 37 has an upper opening 39, such that the hot cooling water is injected in the direction of the arrow 40 into the water reservoir.

The intake of cooler cooling water is done in the vicinity of the bottom of the heat accumulator via an opening 35, a pipe and a cooling water pump 36.

Instead of the described open cooling circulation system here, the cooling system consisting of pipes 34, 37 could also be a closed loop system, whereby between both pipes a heat exchanger would have to be placed.

Furthermore, there is an air bleeding pipe, which mainly consists of a pipe 42, which has an upper opening 41 and a lower drain valve 43, located close to the floor. Air accumulating in the upper area of the heat accumulator can bleed via the drain valve 43 and the opening 41 as needed.

Figure 3:
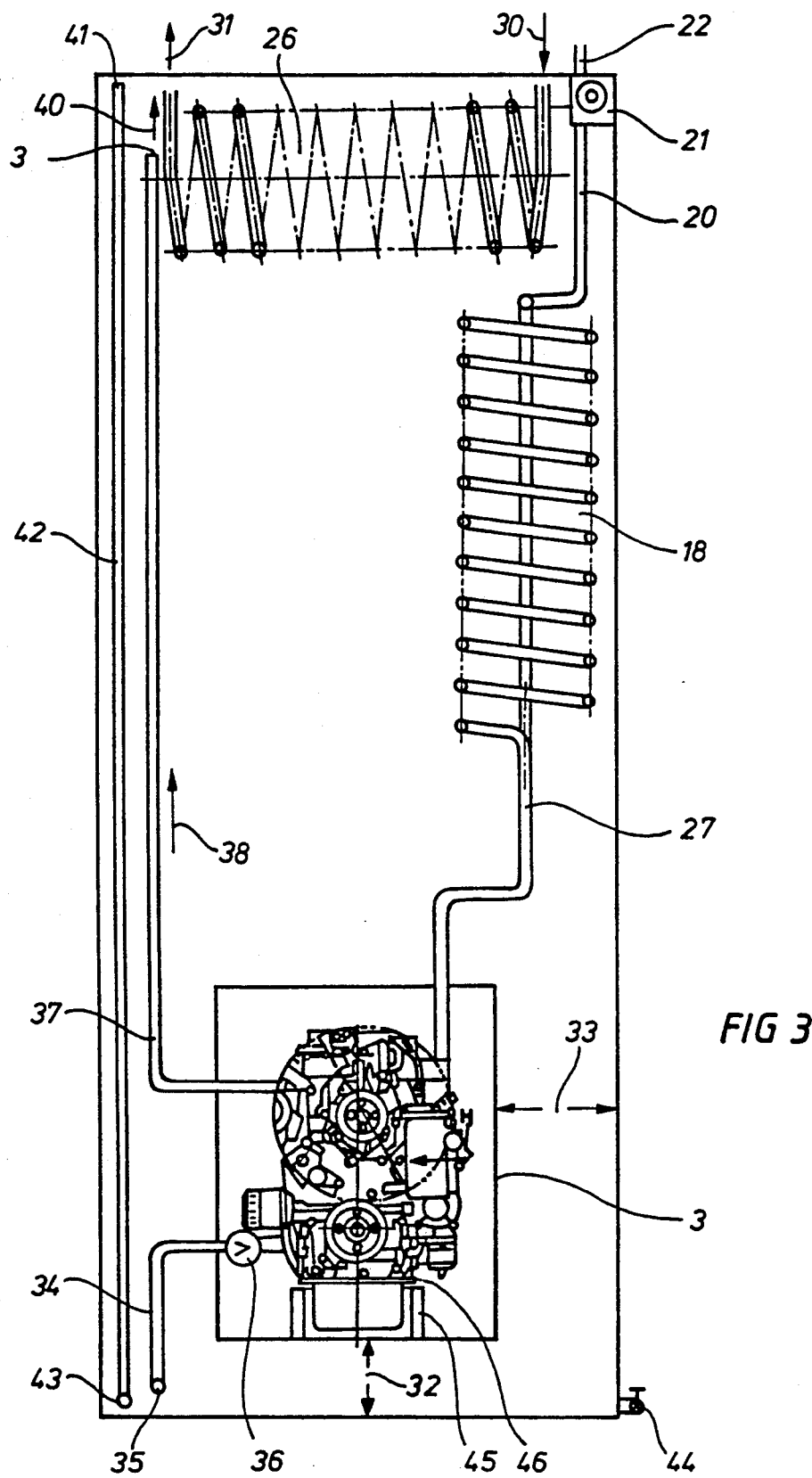
FIG. 3 is schematic elevation, similar to FIG. 1, of a second embodiment of the invention.

In addition, the exhaust gases heat the heat accumulator. FIGS. 1 and 3 show different forms of implementing this heating.

The exhaust gases are initially led via exhaust pipe 17 from the chamber 3 and enter the heat accumulator where they enter and heat a heat exchanger 18. Therefore, the heat exchanger 18 heats the water of the heat accumulator. At the exit of the heat exchanger 18 the cooled off exhaust gases enter a pipe 20 and then the muffler 21 which is mounted at the ceiling of the housing 1. Thus, the muffler 21 is accessible from the top for repair and exchange purposes.

The muffler 21 enters an exhaust pipe 22, through which the cooled off exhaust gases escape and which are either fed into a chimney or directly out to the atmosphere or can be used for powering an absorption cooling unit, which is used for air-conditioning of rooms.

The preparation of the heating water is accomplished via a secondary heat exchanger 26 which is preferably located in the upper area 24 of the heat accumulator. It is preferable for the area 24 to be separated, by means of a perforated metal sheet 23 from the lower area 25, to achieve a collection of relatively warm water in the upper area 24. By the use of the perforated metal sheet 23 which divides the complete water reservoir, a heat layer with an upper warmer area and a lower cooler area 25 is achieved. The secondary heat exchanger 26 shows on one side the forerun 30 and on the other side the return 31 for the heating water to be heated.

For the potable water heating another warm water storage 27 is provided, which also shows a forerun 28 and a return 29.

For space reasons the warm water storage 27 could be arranged within the secondary heat exchanger 26; i.e. the two heat exchangers 26, 27 are then interlocked in the hot-water tank.

By the way, the comparison of FIGS. 1 and 3 shows also that the chamber 3 can be arranged freely in the area of the housing 1.

This means that the distance 32 between the lower edge of the chamber 3 and the floor of the housing 1 is changeable and is to be adapted to the respective requirements. By the same token, the chamber 3 does not have to be centered in the housing 1, but the side distance 33 can also be changed.

Depending on the arrangement of the chamber 3 within the housing 1, the heat exchange via conduction and radiation into the hot-water tank is affected.

The total liquid content can be drained via a lower drain valve 44.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

It is claimed:

1. An electric power generator comprising an electric motor driven by an internal combustion engine, wherein the electric motor and engine (4,11) are mounted in an enclosure forming a chamber (3), which is enclosed in a housing (1) with an insulating casing (13), and which is surrounded by liquid (2) disposed within said housing (1), said internal combustion engine having a coolant system in fluid communication with said liquid (2).

2. An electric power generator according to claim 1, further comprising at least one secondary heat exchanger located in the liquid (2) disposed in said housing (1), having a forerun (30) for the intake of liquid from outside the housing (1) and a return (31) for expelling heated liquid.

3. An electric power generator according to claim 2, including an exhaust air muffler (21).

4. An electric power generator according to claim 3, further comprising at least one heat exchanger (18) located in the liquid (2) in said housing (1) attached to the engine and through which exhaust gases flow.

5. An electric power generator according to claim 4, wherein said housing (1) has an upper area (24) separated by a perforated metal sheet (23) for containing said secondary heat exchanger (26).

6. An electric power generator according to claim 5, wherein the electric motor and the engine (4,11) are mounted on a slide and are freely accessible via a door formed in the housing.

7. An electric power generator according to claim 4, wherein the electric motor and the engine (4,11) are mounted on a slide and are freely accessible via a door formed in the housing.

8. An electric power generator according to claim 3, wherein said housing (1) has an upper area (24) separated by a perforated metal sheet (23) for containing said secondary heat exchanger (26).

9. An electric power generator according to claim 8, wherein the electric motor and the engine (4,11) are mounted on a slide and are freely accessible via a door formed in the housing.

10. An electric power generator according to claim 3, wherein the electric motor and the engine (4,11) are mounted on a slide and are freely accessible via a door formed in the housing.

11. An electric power generator according to claim 2, further comprising at least one heat exchanger (18) located in the liquid (2) in said housing (1) attached to the engine and through which exhaust gases flow.

12. An electric power generator according to claim 11, wherein said housing (1) has an upper area (24) separated by a perforated metal sheet (23) for containing said secondary heat exchanger (26).

13. An electric power generator according to claim 12, wherein the electric motor and the engine (4,11) are mounted on a slide and are freely accessible via a door formed in the housing.

14. An electric power generator according to claim 11, wherein the electric motor and the engine (4,11) are mounted on a slide and are freely accessible via a door formed in the housing.

15. An electric power generator according to claim 2, wherein said housing (1) has an upper area (24) separated by a perforated metal sheet (23) for containing said secondary heat exchanger (26).

16. An electric power generator according to claim 15, wherein the electric motor and the engine (4,11) are mounted on a slide and are freely accessible via a door formed in the housing.

17. An electric power generator according to claim 2, wherein the electric motor and the engine (4,11) are mounted on a slide and are freely accessible via a door formed in the housing.

18. An electric power generator according to claim 1, further comprising at least one heat exchanger (18) located in the liquid (2) in said housing (1) attached to the engine and through which exhaust gases flow.

19. An electric power generator according to claim 18, wherein said housing (1) has an upper area (24) separated by a perforated metal sheet (23) for containing said secondary heat exchanger (26).

20. An electric power generator according to claim 19, wherein the electric motor and the engine (4,11) are mounted on a slide and are freely accessible via a door formed in the housing.

21. An electric power generator according to claim 18, wherein the electric motor and the engine (4,11) are mounted on a slide and are freely accessible via a door formed in the housing.

22. An electric power generator according to claim 1, wherein the electric motor and the engine (4,11) are mounted on a slide and are freely accessible via a door formed in the housing.

23. An electric power generator comprising an electric motor driven by an internal combustion engine, wherein the electric motor and engine (4,11) are mounted in an enclosure forming a chamber (3), which is enclosed in a housing (1) with an insulating casing (13), and wherein said enclosure has two opposing parallel sides in common with walls of said housing, and there being at least one door in at least one of the opposing parallel sides for removal of said electric motor and engine, and wherein said enclosure is surrounded by a liquid (2) disposed within said housing (1), said internal combustion engine having a coolant system in fluid communication with said liquid (2).

24. An electric power generator according to claim 23, further comprising at least one secondary heat exchanger (26) located in the liquid (2) disposed in said housing (1), having a forerun (30) for the intake of liquid from outside the housing (1) and a return (31) for expelling heated liquid.

25. An electric power generator according to claim 24, further comprising at least one heat exchanger (18) located in the liquid (2) in said housing (1) attached to the engine and through which exhaust gases flow.

26. An electric power generator according to claim 23, further comprising at least one heat exchanger (18) located in the liquid (2) in said housing (1) attached to the engine and through which exhaust gases flow.

27. An electric power generator according to claim 23, wherein the electric motor and the engine (4,11) are mounted on a slide and are freely accessible through said door.

* * * * *